Patented Oct. 11, 1949

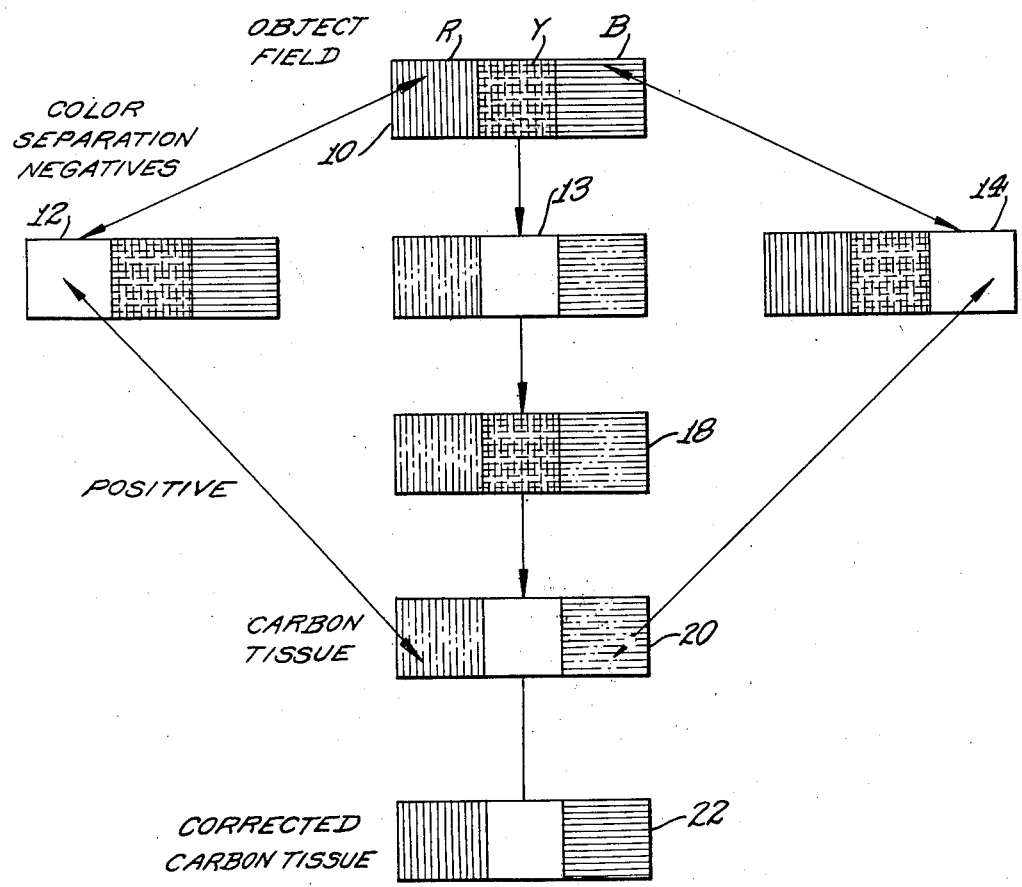

2,484,137

UNITED STATES PATENT OFFICE 2,484,137

PHOTOGRAPHIC COLOR CORRECTION METHOD

Theodore Wheldon, West Englewood, N. J., assignor to Alco-Gravure Division of Publication Corporation, New York, N. Y., a corporation of New York Application August 4, 1945, Serial No. 608,925

3 Claims. (Cl. 95—2)

This invention relates to a color correction method for producing printing plates or cylinders for printing object fields in colors.

In methods of this character the subject matter is photographed through suitable color filters to obtain color separation negatives. On account of the deficiency of the inks, considerable correction must be made in order that the proper color effects may be produced on the final printing. This has been done by making corrective overlays, retouching, and performing other operations to make color separation negatives that are corrected. Positives are then made from the corrected negatives, and these positives are then exposed on what is called a carbon tissue, which is merely a paper backing formed with a sensitized gelatin coating. The positives whether screened or unscreened are exposed on the carbon tissue which is hardened over its area in accordance with the amount of light falling upon it through the positive. If the positive is unscreened, a screen is exposed on the carbon tissue, the tissue is then applied to the printing cylinder, the paper removed, and the unexposed portion of the gelatin washed away. The cylinder is then etched and the hardened portions of the gelatin which have been exposed to the light through the positive resist the action of the etching medium in proportion to the degree in which they have been hardened. This provides the control under which the cylinder is etched.

The operation of correcting the various color separation negatives to cause proper color rendition to be accomplished is a complicated and difficult one and, therefore, the principal object of this invention is the provision of a method by which these difficulties and complications are avoided. More specifically, it is an object of this invention to solve the problem of color correction from a different angle by effecting color correction on the carbon tissue rather than on the various separation negatives, and it is preferably done by the use of a negative corrector which is exposed to the carbon tissue.

The negative corrector is simply one of the color separation negatives other than the one used to make the positive from which the color cylinder is to be etched by means of the carbon tissue being printed. For example, let us say that the yellow printing cylinder is to be prepared and that yellow, red, and blue color separation negatives have been made from the subject. The yellow separation negative is inherently faulty because magenta and blue-green pigments do not reflect sufficient light to record enough density on the plate and, therefore, will allow a percentage of yellow ink to be printed on these colored areas. If not corrected, the ineffectiveness of the red ink will cause the printing of yellow in red areas where no yellows should appear, resulting in orange tints in the red areas. Likewise, the ineffectiveness of the blue ink results in the printing of greenish tints where blue should be printed, and, therefore, if there is much blue or red in the object field, it is desirable to correct for yellow printing, by correcting the carbon tissue which is used to etch the yellow printing cylinder, to eliminate such undesired tints.

Assume, for example, that the yellow separation negative, which should be transparent where yellow occurs and opaque where red and blue occur, was exposed too little where the reds and blues occur. This is undesirable because the result will be that a greenish tint will be printed in the blues rather than a true blue and an orange in the reds rather than a true red. In accordance with the present invention, instead of correcting the yellow separation negative, a positive is made from the yellow separation negative which will show the yellow regions by a silver deposit, the density of which varies with the tone strength. This yellow positive will also carry some density in the region where the reds and blues are also present. When this positive is exposed on the carbon tissue, the carbon tissue becomes a negative and is unexposed where the yellow occurs, but should be fully exposed where the reds and blues occurred. Because of the error assumed above, the silver deposit in the region where the reds and blues occur will not allow the carbon tissue to be completely exposed in these regions, and that is the fault existing in the carbon tissue.

Other objects of this invention will appear from the following description taken in connection with the single figure of the accompanying drawing.

In the drawing in which the steps of the method are illustrated, there is disclosed an object field 10 which is shown as including three color printing inks, magenta, yellow and blue green, commonly referred to as red, yellow and blue, and which for the purpose of disclosure have been shown as occupying separate distinct sections of the object field.

Color separation negatives indicated at 12, 13 and 14 are made of the object field through red, green and blue filters, and positives are made from each of these negatives, the drawing disclosing only the positive 18 made from the yellow color separation negative. The transparent sections of the color separation negatives corresponding to the red, yellow and blue regions are indicated by clear areas.

The yellow color separation negative 13 made through the blue filter will contain transparent areas or portions corresponding in positions and contours to the yellow points, lines and areas in the object field as indicated by a clear area in the center of the negative 13. It may also contain insufficiently dense portions resulting from the ineffectiveness of the blue and red ink to properly affect the plate, which are indicated by broken lines in the regions corresponding to the red and blue regions of the object field.

The positive 18 printed from the yellow color separation negative will contain non-transparent portions of different densities corresponding in position and contour to the yellow areas in the object field and indicated by cross-hatching lines, and also portions of slight density corresponding to the positions and areas of the blues and reds in the object field from which not enough light was reflected by the blue and red inks in making the yellow color separation negative. These latter areas of slight density are indicated by broken lines. The carbon tissue 20 made from this positive would have unhardened sections indicated by clear areas corresponding to the contours and positions of the yellow areas in the object field and semi-hardened sections indicated by broken lines corresponding to the contours and positions of some of the blue and red areas in the object field which had an insufficient exposure, and a printing cylinder etched under the control of this carbon tissue would print yellow not only in positions corresponding to the yellow areas of the object field, but also some yellow in positions corresponding to the blue and red areas which were not of sufficient density in the yellow negative.

In order to correct the carbon tissue 20 after it has been exposed to the positive produced from the negative made through the blue filter, for example, to correct it for the blues, the carbon tissue 20 is then exposed to the color separation negative 14 produced through the red filter which has clear portions in all positions corresponding to the blue areas in the object field and, therefore, in positions corresponding to the non-transparent portions on the positive 18 which were caused by the deficiencies of the blue ink in reflecting light from the blue area of the object field as the yellow color separation negative was made. This causes the corresponding areas on the carbon tissue to be hardened in the corrected carbon tissue 22, so that areas of the cylinder or printing plate corresponding to the areas of the blue in the object field will not be etched, and the only etching that will be accomplished will be in areas corresponding to the yellow areas in the object field. If the red areas suffered in a similar manner, the correction will be made by using the red color separation negative in the manner above described.

The carbon tissues for printing the reds and the blues will likewise be corrected by exposing the respective positives on the carbon tissues for the respective cylinder and then using the other negatives for correction purposes.

It is obvious that the method is applicable for correcting carbon tissues regardless of the colors and shades or tints of colors, or black, in the object field, and that the number of color separation negatives used in correcting a carbon tissue varies with the colors and their depth of tone. In correcting the blacks, all three positives should be used as correctors. In the claims the term "color" has been used in a generic sense. The exposure of the corrector negative is only a fraction of the exposure of the principal positive, the errors of which are being corrected, but this is determined by the operator in each case and is well within the skill of the photographer.

While the invention has been described with reference to a preferred order of procedure illustrated in the drawings and with reference to an object field containing three primary and elemental colors, it is to be understood that this has been done for purposes of disclosure only and is not to be considered limiting, and the right is reserved to all such changes and variations in the method as fall within the scope of the appended claims.

I claim:

1. The method of preparing printing surfaces for printing a subject matter in colors, comprising preparing a set of color separation negatives, at least one of which is deficient in that it is only partially exposed in regions corresponding to a color other than the color for which it is a color separation negative, preparing a set of color separation positives, at least one of which bears said deficiencies as they are transmitted by normal photographic operations, exposing the positives on separate carbon tissues by normal photographic operations whereby the deficiencies of the respective color separation negatives are repeated in the carbon tissues, exposing upon the unfixed carbon tissue for one color the color separation negative of another color corresponding to a color rendering deficient the color separation negative for said one color, whereby exposure on the unfixed carbon tissue completes the exposure necessary to correct on the carbon tissue the deficiencies due to the partial exposure of said carbon tissue in the regions corresponding to said other color, and preparing a printing surface from the corrected carbon tissue.

2. The method of preparing by etching an intaglio printing surface for printing a colored area of an object field in color, comprising preparing a set of color separation negatives, at least one of which is deficient in that it is only partially exposed in regions corresponding to a color other than the color for which it is a color separation negative, preparing a color separation positive from said deficient negative, said positive bearing the deficiencies of said negative as they are transmitted by normal photographic operations, exposing said positive on a carbon tissue by normal photographic operations whereby the deficiencies of said deficient color separation negative are repeated in the carbon tissue, exposing upon said unfixed carbon tissue the color separation negative of another color corresponding to a color rendering deficient the color separation negative from which said carbon tissue was prepared, whereby said exposure on the unfixed carbon tissue completes the exposure necessary to correct on the carbon tissue the deficiencies due to the partial exposure of said deficient negative in the regions corresponding to said other color, and preparing a printing surface from the corrected carbon tissue.

3. The method of preparing by etching a printing surface for printing a colored area of an object field in color, comprising preparing a set of color separation negatives, one of which is deficient in that it is only partially exposed in regions corresponding to a color other than the color for which it is a color separation negative, preparing a color separation positive from said deficient negative, said positive bearing the deficiencies of the aforesaid deficient negative as they are transmitted by normal photographic operations, exposing said positive on a carbon tissue by normal photographic operations whereby the deficiencies of said deficient color separation negative are repeated in said carbon tissue, then exposing upon said unfixed carbon tissue the color separation negative of another color corresponding to a color rendering deficient the color separation negative from which said carbon tissue was prepared to prevent etching of said printing surface outside of the area corresponding to said color area of said object field.

THEODORE WHELDON.

REFERENCES CITED

The following references are of record in the file of this patent:

UNITED STATES PATENTS

| Number | Name | Date |
| --- | --- | --- |
| 1,558,219 | Barton | Oct. 20, 1925 |
| 2,268,791 | Yule | Jan. 6, 1942 |
| 2,307,996 | Dearing | Jan. 12, 1943 |
| 2,340,656 | Gaspar | Feb. 1, 1944 |
| 2,347,119 | Michaelis | Apr. 18, 1944 |

FOREIGN PATENTS

| Number | Country | Date |
| --- | --- | --- |
| 360,441 | Great Britain | Nov. 3, 1931 |